US009930111B2

(12) United States Patent
Sharma et al.

(10) Patent No.: US 9,930,111 B2
(45) Date of Patent: *Mar. 27, 2018

(54) TECHNIQUES FOR WEB SERVER MANAGEMENT

(71) Applicant: Oracle International Corporation, Redwood Shores, CA (US)

(72) Inventors: Chhaya Sharma, Indore (IN); Varun Khurana, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 14/507,554

(22) Filed: Oct. 6, 2014

(65) Prior Publication Data
US 2015/0026337 A1   Jan. 22, 2015

Related U.S. Application Data

(63) Continuation of application No. 12/632,068, filed on Dec. 7, 2009, now Pat. No. 8,880,679.

(51) Int. Cl.
*G06F 15/173* (2006.01)
*H04L 29/08* (2006.01)
(Continued)

(52) U.S. Cl.
CPC ....... *H04L 67/1025* (2013.01); *G06F 9/505* (2013.01); *H04L 43/0876* (2013.01); *H04L 29/08* (2013.01); *H04L 29/08288* (2013.01)

(58) Field of Classification Search
None
See application file for complete search history.

(56) References Cited

U.S. PATENT DOCUMENTS 7,778,981 B2   8/2010   Armitano et al.
7,864,672 B1   1/2011   DeCaluwe et al.
(Continued)

OTHER PUBLICATIONS

U.S. Appl. No. 12/632,068 Notice of Allowance dated Jul. 9, 2014, 17 pages.
(Continued)

*Primary Examiner* — Viet Vu
*Assistant Examiner* — James Edwards
(74) *Attorney, Agent, or Firm* — Kilpatrick Townsend & Stockton LLP

(57) ABSTRACT

Techniques for provisioning and decommissioning web servers in an automated manner. In one embodiment, a threshold value relating to an operational metric of a web server can be stored. The metric can be monitored as the web server receives requests. If the metric exceeds the threshold value, additional web servers can be automatically provisioned to handle a portion of the requests. If the metric falls below the threshold value, the additional web servers can be automatically decommissioned. In another embodiment, information can be logged pertaining to web server requests received over time. Based on this information and a threshold value, patterns of high/low server load can be determined and a policy can be generated identifying time intervals during which additional web servers should be provisioned (or existing web servers should be decommissioned). The policy can be used at server runtime to provision or decommission web servers at the identified intervals.

15 Claims, 7 Drawing Sheets

(51) Int. Cl.
*G06F 9/50* (2006.01)
*H04L 12/26* (2006.01)

(56) References Cited

U.S. PATENT DOCUMENTS

| | | | |
|---|---|---|---|
| 8,056,082 B2 | 11/2011 | Koretz et al. | |
| 8,806,629 B1* | 8/2014 | Cherepov | H04L 63/1416 |
| | | | 726/23 |
| 8,880,679 B2 | 11/2014 | Sharma et al. | |
| 2002/0198923 A1 | 12/2002 | Hayes, Jr. | |
| 2004/0047354 A1* | 3/2004 | Slater | H04L 41/0896 |
| | | | 370/400 |
| 2005/0091344 A1 | 4/2005 | Chen et al. | |
| 2006/0056618 A1* | 3/2006 | Aggarwal | G06Q 10/0631 |
| | | | 380/1 |
| 2006/0156274 A1 | 7/2006 | Andreev et al. | |
| 2007/0150571 A1* | 6/2007 | Haga | G06Q 10/06 |
| | | | 709/223 |
| 2007/0265814 A1* | 11/2007 | Moore | G06F 8/10 |
| | | | 703/10 |
| 2008/0155249 A1 | 6/2008 | Backof et al. | |
| 2009/0198502 A1 | 8/2009 | Williams | |
| 2010/0131668 A1 | 5/2010 | Kamath et al. | |
| 2010/0138475 A1 | 6/2010 | Frank et al. | |
| 2010/0211956 A1* | 8/2010 | Gopisetty | G06F 9/5088 |
| | | | 718/104 |
| 2010/0268764 A1 | 10/2010 | Wee et al. | |
| 2010/0293544 A1 | 11/2010 | Wilson et al. | |
| 2012/0086552 A1 | 4/2012 | Fast et al. | |
| 2013/0021432 A1 | 1/2013 | Kalipatnapu et al. | |

OTHER PUBLICATIONS

U.S. Appl. No. 12/632,068, Non-Final Office Action dated Feb. 25, 2014, 25 pages.
U.S. Appl. No. 12/632,068, Final Office Action dated Oct. 21, 2011, 17 pages.
U.S. Appl. No. 12/632,068, Non-Final Office Action dated May 10, 2011, 16 pages.

* cited by examiner

TECHNIQUES FOR WEB SERVER MANAGEMENT

CROSS-REFERENCES TO RELATED APPLICATIONS

This application is a continuation of U.S. patent application Ser. No. 12/632,068 filed on Dec. 7, 2009, now allowed, the entire contents of which are hereby incorporated by reference in its entirety for all purposes.

BACKGROUND

The present disclosure relates in general to web server management, and in particular to techniques for provisioning and decommissioning web servers in an automated manner.

In current practice, server resources for a web site are generally provisioned in a manual fashion. For example, in a typical deployment scenario, an administrator for a web site will estimate an average amount of traffic that the web site is expected to receive (e.g., ten thousand requests per day). The administrator will then manually provision a number of web servers for the web site based upon the estimate.

While the above approach is serviceable if the amount of traffic received by a web site is relatively stable, it can be problematic if the web site experiences spikes where the amount of traffic significantly exceeds or falls under the expected amount. For example, during times of extremely high traffic, the web servers provisioned for the web site can become so overloaded with requests that they fail to service all of the requests successfully. This can lead to denial of service for clients. As another example, during times of extremely low traffic, the web servers provisioned for the web site can become under-utilized, leading to a waste of server resources. To address these issues, an administrator of the web site can try to manually reconfigure the number of web servers provisioned for the web site when traffic spikes occur. However, such manual reconfiguration is cumbersome and typically cannot be performed quickly enough to completely avoid denial of service (at times of high traffic) or under-utilization of resources (at times of low traffic).

Accordingly, it is desirable to have improved techniques for provisioning server resources for a web site.

BRIEF SUMMARY

Embodiments of the present invention provide techniques for provisioning and decommissioning web servers in an automated manner. In certain embodiments, the techniques described herein can ensure uninterrupted servicing of client requests while facilitating optimal utilization of web server resources, thereby overcoming the issues associated with manual web server provisioning.

In one set of embodiments, a threshold value can be stored that relates to an operational metric of a web server (e.g., number of requests received per unit time, CPU utilization, etc.). The metric can be monitored as the web server receives requests. If the metric exceeds the threshold value, additional web servers can be automatically provisioned to handle a portion of the requests. If the metric subsequently falls below the threshold value, the additional web servers can be automatically decommissioned. In this manner, web server resources can be dynamically allocated or de-allocated based on real-time traffic.

In another set of embodiments, information can be logged that pertains to requests received by a web server over a period of time. Based on the logged information and a threshold value, patterns of high and/or low server load can be determined and a policy can be generated identifying recurring time intervals during which additional web servers should be provisioned (or existing web servers should be decommissioned). The policy can be used at server runtime to provision or decommission web servers at the identified intervals. In this manner, web server resources can be dynamically allocated and de-allocated based on historic traffic patterns.

In either of the embodiments described above, the threshold value can be received from a user (e.g., a web site administrator) or determined automatically by the web server.

According to one embodiment of the present invention, a method is provided comprising storing, by a computer system, a threshold value for an operational metric of a web server and monitoring, by the computer system, the metric as requests are received by the web server. If the metric exceeds the threshold value, the method further comprises provisioning, by the computer system, one or more additional web servers and routing, by the computer system, a portion of the requests to the one or more additional web servers.

In one embodiment, if the metric subsequently falls below the threshold value, the method further comprises decommissioning, by the computer system, the one or more additional web servers.

In one embodiment, the threshold value is provided by a user. In another embodiment, the threshold value is determined automatically by the computer system.

In the case where the threshold value is determined automatically, the determining comprises logging information related to a plurality of requests received by the web server over a period of time and applying one or more heuristics-based rules to the logged information.

According to another embodiment of the present invention, a method is provided comprising logging, by a computer system, information related to a plurality of requests received by a web server over a period of time and determining, by the computer system, a pattern of high web server load based on the logged information and a threshold value. The threshold value represents a value for an operational metric of the web server that, when exceeded, indicates high web server load. The method further comprises generating, by the computer system, a policy based on the pattern of high web server load, where the policy indicates a recurring time interval during which one or more additional web servers should be provisioned.

In one embodiment, the method further comprises, subsequent to generating the policy, provisioning one or more additional web servers when the recurring time interval arrives and routing a portion of requests received by the web server to the one or more additional web servers during the recurring time interval. In a further embodiment, the one or more additional web servers are decommissioned once the recurring time interval has passed.

In one embodiment, the threshold value is provided by a user. In another embodiment, the threshold value is determined automatically by the computer system. In the latter embodiment, the threshold value is determined by applying one or more heuristics-based rules to the logged information.

In one embodiment, determining the pattern of high web server load comprises processing the logged information using a heuristics-based pattern matching algorithm. In one embodiment, this processing is performed by a complex event processing server.

According to another embodiment of the present invention, a computer readable storage medium is provided that has stored thereon instructions executable by a computer system, the instructions comprising instructions that cause the computer system to store a threshold value for an operational metric of a web server and instructions that cause the computer system to monitor the metric as requests are received by the web server. The instructions further comprise instructions that cause the computer system to, if the metric exceeds the threshold value, provision one or more additional web servers and route a portion of the requests to the one or more additional web servers.

According to another embodiment of the present invention, a computer readable storage medium is provided that has stored thereon instructions executable by a computer system, the instructions comprising instructions that cause the computer system to log information related to a plurality of requests received by a web server over a period of time and instructions that cause the computer system to determine a pattern of high web server load based on the logged information and a threshold value. The threshold value represents a value for an operational metric of the web server that, when exceeded, indicates high web server load. The instructions further comprise instructions that cause the computer system to generate a policy based on the pattern of high web server load, where the policy indicates a recurring time interval during which one or more additional web servers should be provisioned.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of various embodiments of the present invention. It will be apparent, however, to one skilled in the art that certain embodiments can be practiced without some of these details.

Embodiments of the present invention provide techniques for provisioning and decommissioning web servers in an automated manner. In certain embodiments, the techniques described herein can ensure uninterrupted servicing of client requests while facilitating optimal utilization of web server resources, thereby overcoming the issues associated with manual web server provisioning.

In one set of embodiments, a threshold value can be stored that relates to an operational metric of a web server (e.g., number of requests received pre unit time, CPU utilization, etc.). The metric can be monitored as the web server receives requests. If the metric exceeds the threshold value, additional web servers can be automatically provisioned to handle a portion of the requests. If the metric subsequently falls below the threshold value, the additional web servers can be automatically decommissioned. In this manner, web server resources can be dynamically allocated or de-allocated based on real-time traffic.

In another set of embodiments, information can be logged that pertains to requests received by a web server over a period of time. Based on the logged information and a threshold value, patterns of high and/or low server load can be determined and a policy can be generated identifying recurring time intervals during which additional web servers should be provisioned (or existing web servers should be decommissioned). The policy can be used at server runtime to provision or decommission web servers at the identified intervals. In this manner, web server resources can be dynamically allocated and de-allocated based on historic traffic patterns.

In either of the embodiments described above, the threshold value can be received from a user (e.g., a web site administrator) or determined automatically by the web server.

Figure 1:
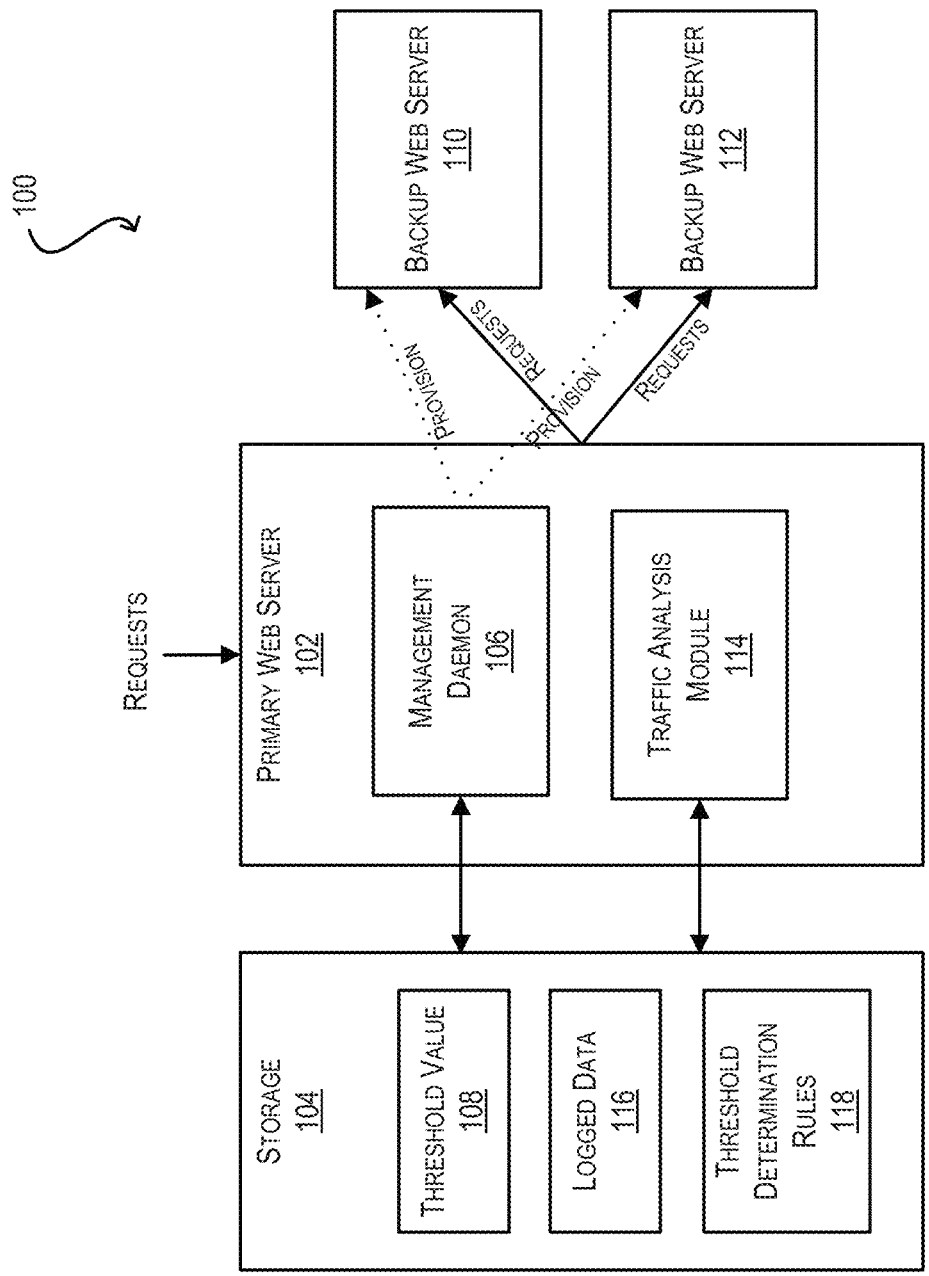
FIG. 1 is a simplified block diagram of a web server system according to an embodiment of the present invention.

FIG. 1 is a simplified block diagram of a web server system 100 according to an embodiment of the present invention. As shown, system 100 can include a primary web server 102 communicatively coupled with a storage component 104. Primary web server 102 can be a software and/or hardware-based module that is configured to receive Hypertext Transfer Protocol (HTTP) requests from clients accessing a web resource (e.g., a website) and to service those requests by returning HTTP responses to the clients. In a particular embodiment, primary web server 102 can be an instance of Oracle HTTP Server, a web server software application developed by Oracle Corporation. Storage component 104 can be any type of storage device (or combination of devices) suitable for storing data accessed by primary web server 102.

In one set of embodiments, primary web server 102 can include a management daemon 106 configured to monitor the server's operation as it receives and processes client requests. For example, management daemon 106 can monitor, in real-time, a value for an operational metric of primary web server 102 such as the number of requests received per unit time, CPU utilization, number of running threads, number of bytes transferred, or the like. As the metric is being monitored, management daemon 106 can compare the real-time value of the metric to a threshold value 108 stored in storage component 104. Threshold value 108 can represent a value for the metric that, when exceeded, indicates heavy web server traffic (and thus high web server load). For instance, a threshold value of "80%" for the CPU utilization metric can indicate that any CPU utilization percentage over 80% represents an excessive load on primary web server 102.

If the real-time value of the metric exceeds threshold value 108, management daemon 106 can automatically provision one or more backup web servers (e.g., 110 and 112). Primary web server 102 can then redirect a portion of the requests it receives to the backup web servers for processing. If the metric subsequently falls back below threshold value 108, management daemon 106 can automatically decommission the backup web servers. In this manner, additional server resources can be dynamically allocated or de-allocated in response to the real-time load on primary web server 102, thereby ensuring uninterrupted servicing of client requests (in the case of high web server load) and avoiding under-utilization of resources (in the case of low web server load).

In one set of embodiments, threshold value 108 can be provided by an administrator of primary web server 102 or some other individual. This approach may be appropriate in situations where the administrator has an understanding of the performance characteristics of primary web server 102 and a sense of what a suitable threshold value should be.

In alternative embodiments, threshold value 108 can be automatically determined by primary web server 102. In these embodiments, primary web server 102 can include a traffic analysis module 114 that is configured to log data about incoming requests to server 102, as well as various runtime statistics (e.g., CPU utilization, number of requests that timeout due to unavailability of resources, etc.). This data can be logged over a period of time and stored in storage component 104 (e.g., as logged data 116). Once sufficient data has been collected, management daemon 106 can analyze logged data 116 and apply a set of heuristics-based threshold determination rules (e.g., rules 118) to determine an appropriate threshold value for one or more operational metrics of primary web server 102. The determined threshold value can then be used as described above to dynamically allocate or de-allocate backup web servers at runtime.

It should be appreciated that FIG. 1 is illustrative and not intended to limit embodiments of the present invention. For example, although management daemon 106 and traffic analysis module 114 are shown as being part of primary web server 102, one or both of these components can be stand-alone components that are separate from server 102. Further, the various components of system 100 may each have additional capabilities or include sub-components that are not specifically described. One of ordinary skill in the art will recognize many variations, modifications, and alternatives.

Figure 2:
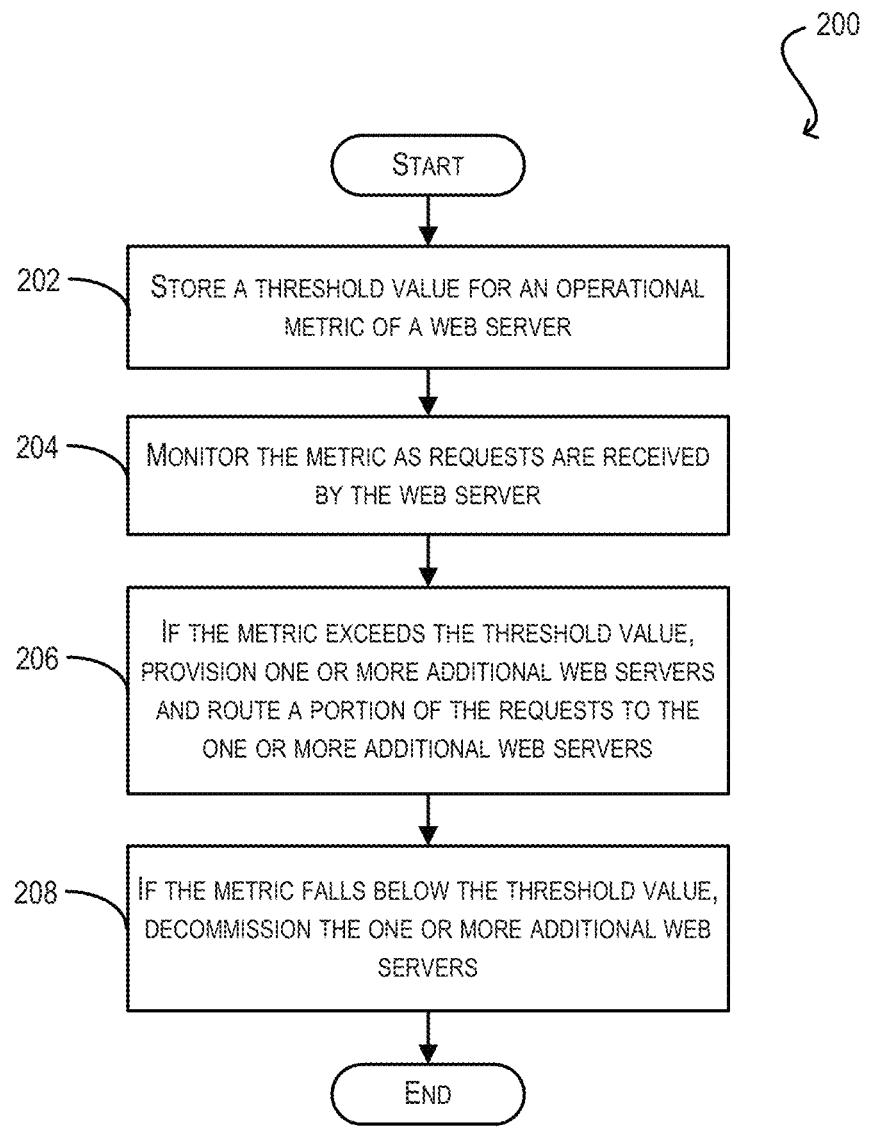
FIG. 2 is a flow diagram of a process for automatically provisioning and decommissioning web servers based on real-time traffic according to an embodiment of the present invention.

FIG. 2 is a flow diagram of a process 200 for automatically provisioning and decommissioning web servers based on real-time traffic according to an embodiment of the present invention. In one set of embodiments, process 200 can be carried out by primary web server 102 (and more specifically, management daemon 106) of FIG. 1. Process 200 can be implemented in hardware, software, or a combination thereof. As software, process 200 can be encoded as program code stored on a machine-readable storage medium.

At block 202, a threshold value (e.g., threshold value 108) can be stored for an operational metric of primary web server 102. The operational metric can be any attribute or statistic that pertains to the runtime operation of primary web server 102, such as the number of requests received by the server per unit time, CPU utilization, number of running threads, number of bytes transferred, and the like. The threshold value can represent a value for the metric that, when exceeded, indicates heavy web server traffic (and thus high web server load). Conversely, the threshold value can represent a value for the metric that, when not exceeded, indicates light or normal web server traffic (and thus low or moderate web server load). As discussed above, in some embodiments the threshold value can be provided by an administrator of primary web server 102 or some other individual. In other embodiments, the threshold value can be determined automatically based on logged web server data (e.g., logged data 116) and a set of heuristics-based rules (e.g., rules 118). The process for automatically determining a threshold value is discussed in greater detail with respect to FIG. 3 below.

At block 204, management daemon 106 can monitor the operational metric as requests are received and processed by primary web server 102. As part of this monitoring, the real-time value of the metric can be compared to the threshold value stored at block 202. If the real-time value of the metric exceeds the threshold value, it is likely that the current load on primary web server 102 is too high for the server to adequately service all incoming requests. Accordingly, one or more additional web servers (e.g., backup web servers 110 and 112) can be automatically provisioned by management daemon 106, and a portion of the requests received by primary web server 102 can be routed to the backup web servers (block 206). By provisioning these additional backup web servers, the load on primary web server 102 can be reduced and incoming client requests can be serviced without interruption.

In some embodiments, when backup web servers 110 and 112 are provisioned per block 206, all of the requests received by primary web server 102 can be redirected to the backup web servers. In these embodiments, primary web server 102 essentially acts as a proxy server/load balancer while backup web servers 110 and 112 are operational. Primary web server 102 can determine how to redirect the requests using known load balancing techniques. In alternative embodiments, primary web server 102 can continue to service a portion of the incoming requests while routing the excess traffic that it cannot handle to backup web servers 110 and 112.

In certain embodiments, the number of backup web servers that are provisioned at block 206 can be predetermined; in other embodiments, the number of backup servers that are provisioned can vary based on the extent to which the threshold value is exceeded. Although two backup web servers are shown in FIG. 1, it should be appreciated that any number of backup web servers can be supported.

While backup web servers 110 and 112 are in use, the operational metric of primary web server 102 can be continually monitored. If the metric falls back below the threshold value, it is likely that the backup web servers are no longer required. Accordingly, backup web servers 110 and 112 can be automatically decommissioned and primary web server 102 can resume servicing of all incoming requests (block 208). In this manner, the amount of provisioned server resources can be automatically kept in line with the actual traffic load.

It should be appreciated that process 200 is illustrative and that variations and modifications are possible. Steps described as sequential may be executed in parallel, order of steps may be varied, and steps may be modified, combined, added, or omitted. One of ordinary skill in the art would recognize many variations, modifications, and alternatives.

Figure 3:
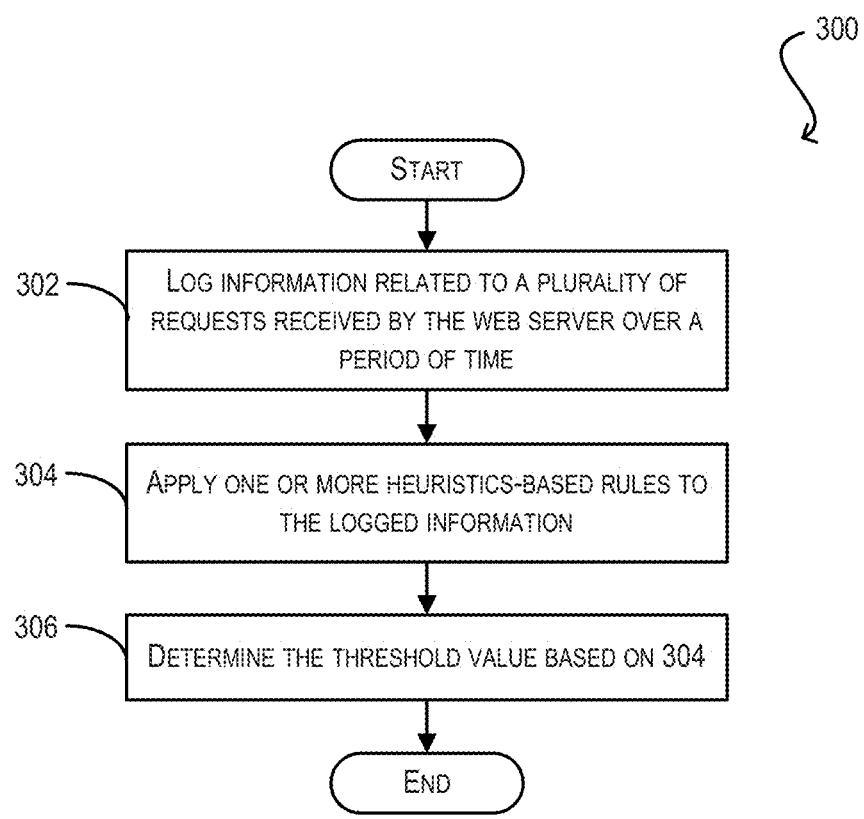
FIG. 3 is a flow diagram of a process for automatically determining a threshold value according to an embodiment of the present invention.

As discussed above, in certain embodiments the threshold value used to determine when backup web servers should be provisioned can be automatically determined by the primary web server (rather than being specified by a user). FIG. 3 is a flow diagram of a process 300 for automatically determining such a threshold value according to an embodiment of the present invention. In one set of embodiments, process 300 can be carried out by primary web server 102 (and more specifically, traffic analysis module 114 and management daemon 106) of FIG. 1. Process 300 can be implemented in hardware, software, or a combination thereof. As software, process 300 can be encoded as program code stored on a machine-readable storage medium.

At block 302, traffic analysis module 114 can log data related to requests received by primary web server 102 over a period of time (e.g., a week, a month, a year, etc.). For instance, the logged data can include, for each request, the particular resource being requested, the time at which the request was received, and various statistics of primary web server 102 as of that time (e.g., CPU utilization, response time, number of requests that have timed out, etc.).

After a sufficient amount of data has been logged, management daemon 106 can apply a set of heuristics-based rules to the logged data to determine an appropriate threshold value (block 304). For example, one such rule may indicate that an appropriate threshold value for CPU utilization is the value at which response time (e.g., the time it takes to return a response to a client) exceeds five seconds. Thus, management daemon 106 can apply this rule by identifying, in the logged data, historical values for CPU utilization at times when the response time exceeded five seconds. These historical values can then be averaged (or processed in some other manner) to generate a threshold value for CPU utilization (block 306).

In one set of embodiments, the processing of blocks 304 and 306 can carried out by management daemon 106 at runtime of primary web server 102. In other embodiments, the processing can be carried out by management daemon 106 as an offline process. In certain embodiments, the processing of blocks 304 and 306 can be re-executed by management daemon 106 on a periodic basis as new data is logged by traffic analysis module 114.

It should be appreciated that process 300 is illustrative and that variations and modifications are possible. Steps described as sequential may be executed in parallel, order of steps may be varied, and steps may be modified, combined, added, or omitted. One of ordinary skill in the art would recognize many variations, modifications, and alternatives.

Figure 4:
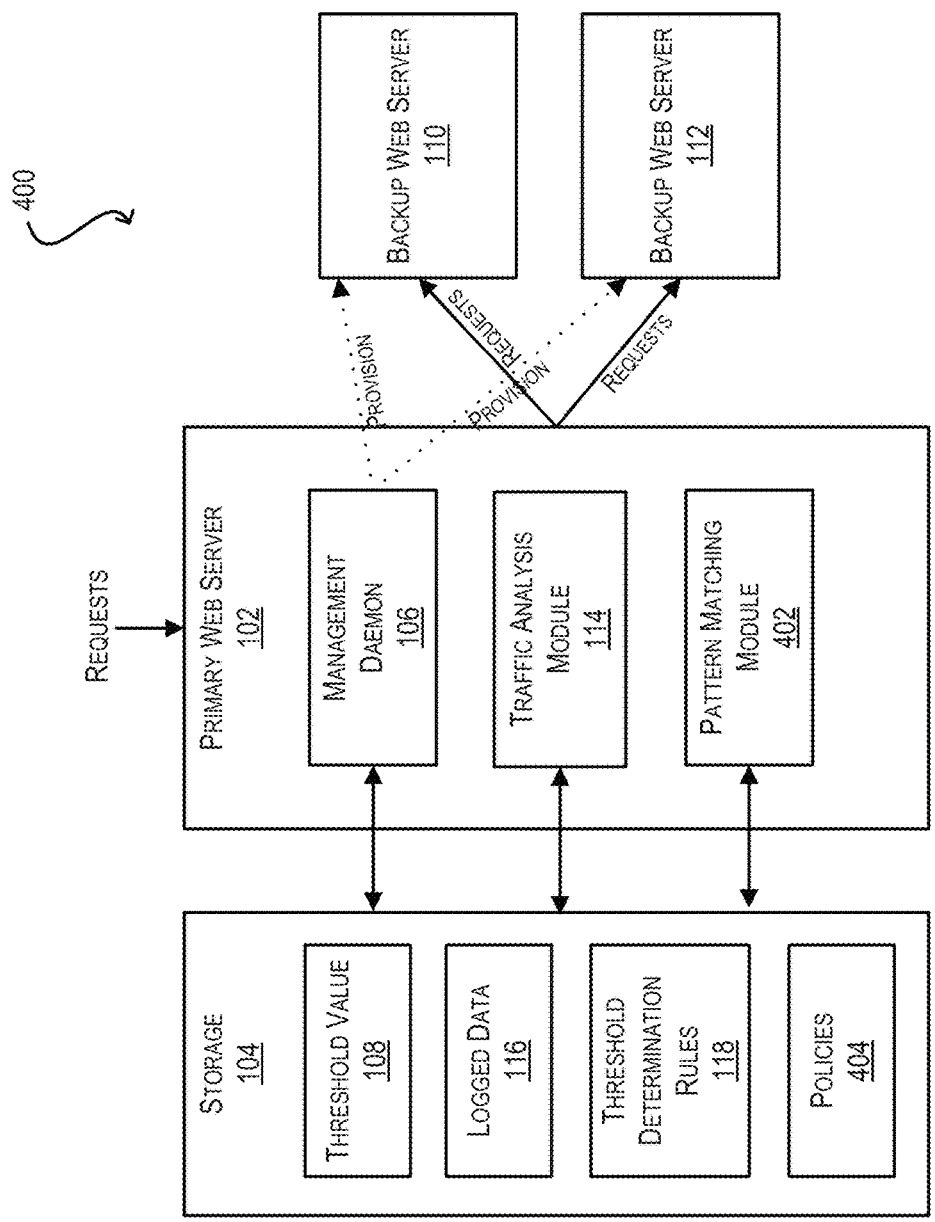
FIG. 4 is a simplified block diagram of another web server system according to an embodiment of the present invention.

FIG. 4 is a simplified block diagram of a second web server system 400 according to an embodiment of the present invention. As shown, system 400 includes components that are similar to system 100 of FIG. 1, such as primary web server 102 (comprising management daemon 106 and traffic analysis module 114), storage component 104 (comprising threshold value 108, logged data 116, and threshold determination rules 118), and backup web servers 110 and 112. System 400 can also include additional components (pattern matching module 402 and policies 404) that allow for the automatic provisioning and decommissioning of web servers based on historical traffic patterns (rather than, or in addition to, real-time traffic).

In one set of embodiments, traffic analysis module 114 is configured to log data about requests received by primary web server 102. The data collected is similar to block 302 of FIG. 3 and can include, for each request, the particular resource being requested, the time at which the request was received, and various statistics of primary web server 102 as of that time (e.g., CPU utilization, response time, number of requests that have timed out, etc.). This data can be logged over a period of time and stored in storage component 104 (e.g., as logged data 116).

Once sufficient data has been logged, management daemon 106 is configured to analyze the logged data to determine recurring time intervals of heavy web server traffic (and thus, high load on primary web server 102). In certain embodiments, this analysis can be based on a threshold value for an operational metric of primary web server 102 (e.g., threshold value 108), and can involve identifying time intervals in the logged data where the metric exceeds the threshold. In a particular embodiment, this identification can be performed via a heuristics-based pattern matching module such as module 402. Management daemon 106 can then generate a policy 404 indicating that backup web servers should be provisioned during the identified time intervals.

Once policy 404 has been generated, management daemon 106 can apply the policy at runtime of primary web server 102. For example, if the policy indicates that high server load typically occurs on Mondays from noon to 2 PM, management daemon 106 can automatically provision backup web servers 110 and 112 every Monday at noon. Primary web server 102 can then route incoming requests to the backup web servers during this time interval. Once the time interval has passed, management daemon 106 can automatically decommission the backup web servers. In this manner, server resources can be dynamically allocated and de-allocated based on historical traffic patterns (which will typically indicate future traffic patterns).

It should be appreciated that FIG. 4 is illustrative and not intended to limit embodiments of the present invention. For example, although management daemon 106, traffic analysis module 114, and pattern matching module 402 are shown as being part of primary web server 102, one or more of these components can be standalone components that are separate from server 102. Further, the various components of system 400 may each have additional capabilities or include sub-components that are not specifically described. One of ordinary skill in the art will recognize many variations, modifications, and alternatives.

Figure 5:
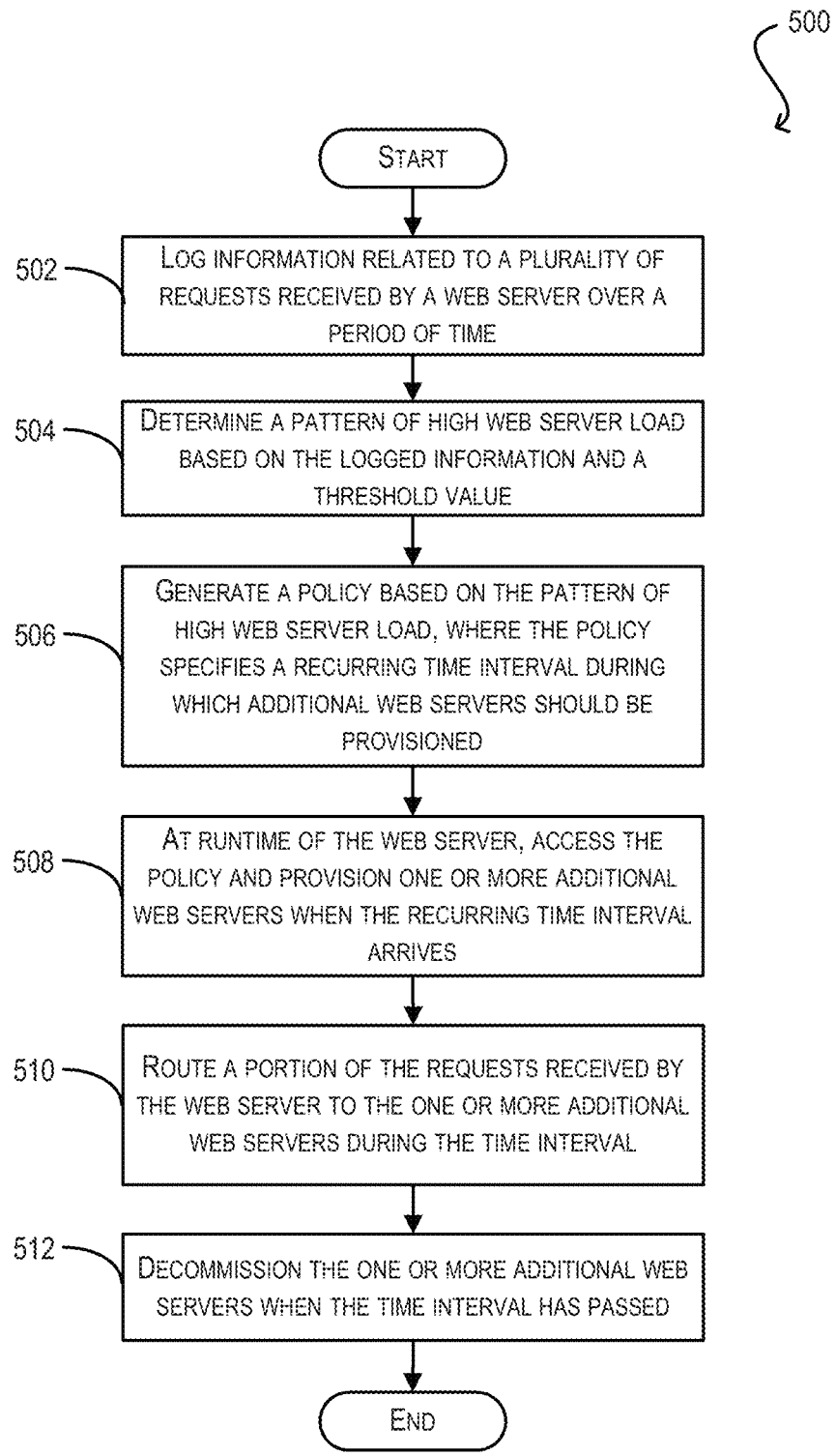
FIG. 5 is a flow diagram of a process for automatically provisioning and decommissioning web servers based on historical traffic patterns according to an embodiment of the present invention.

FIG. 5 is a flow diagram of a process 500 for automatically provisioning and decommissioning web servers based on historical traffic patterns according to an embodiment of the present invention. In one set of embodiments, process 500 can be carried out by primary web server 102 (and more specifically, traffic analysis module 114, management daemon 106, and pattern matching module 402) of FIG. 4. Process 500 can be implemented in hardware, software, or a combination thereof. As software, process 500 can be encoded as program code stored on a machine-readable storage medium.

At block 502, traffic analysis module 114 can log data related to requests received by primary web server 102 over a period of time (e.g., a week, a month, a year, etc.). As discussed above, this logged data can include, for each request, the particular resource being requested, the time at which the request was received, and various statistics of primary web server 102 as of that time (e.g., CPU utilization, response time, number of requests that have timed out, etc.).

At block 504, management daemon 106 can determine, based on the logged data and a threshold value (e.g., threshold value 108), recurring time intervals of heavy web server traffic (and thus high web server load). For instance, management daemon 106 can determine that high server load typically occurs on Mondays from noon to 2 PM because CPU utilization commonly exceeds 80% during that time interval, and because the threshold value for the CPU utilization metric is "80%". To identify such patterns, management daemon 106 can, in some embodiments, rely on a module that uses heuristics-based pattern matching algorithms to find patterns in data streams (e.g., pattern matching module 402). An example of such a module is the Oracle Complex Event Processing Server developed by Oracle Corporation. At block 506, management daemon 106 can generate a policy (e.g., policy 404) that specifies the recurring time intervals determined at block 504.

In one set of embodiments, the processing of blocks 504 and 506 can carried out by management daemon 106 at runtime of primary web server 102. In other embodiments, the processing can be carried out by management daemon 106 as an offline process.

In yet further embodiments, the processing of blocks 504 and 506 can be re-run by management daemon 106 on a periodic basis to account for changes in web server load patterns over time. For instance, new data can be logged and new policies can be generated every week, month, quarter, year, etc.

Like process 200 of FIG. 2, the threshold value used at block 504 can either be provided by a user or automatically determined by primary web server 102. In the latter case, prior to analyzing the logged data to determine time intervals of high web server load, management daemon 106 can first analyze the logged data and apply a set of heuristics-based rules to determine an appropriate threshold value for one or more operational metrics of primary web server 102 (similar to blocks 304, 306 of FIG. 3). The determined threshold value can then be used as part of the processing of block 504.

At block 508, management daemon 106 can apply the policy generated at block 504 at runtime of primary web server 102. For example, if the policy indicates that high server load typically occurs on Mondays from noon to 2 PM, management daemon 106 can automatically provision backup web servers (e.g., backup web servers 110 and 112) every Monday at noon. Primary web server 102 can then route a portion of the requests it receives to the backup web servers during this time interval (block 510). Once the time interval has passed, management daemon 106 can automatically decommission the backup web servers (block 512).

In some embodiments, when backup web servers 110 and 112 are provisioned per block 508, all of the requests received by primary web server 102 can be redirected to the backup web servers. In these embodiments, primary web server 102 essentially acts as a proxy server/load balancer while backup web servers 110 and 112 are operational. Primary web server 102 can determine how to redirect the requests using known load balancing techniques. In alternative embodiments, primary web server 102 can continue to service a portion of the incoming requests while routing the excess traffic that it cannot handle to backup web servers 110 and 112.

In certain embodiments, the number of backup web servers that are provisioned at block 508 can be static; in other embodiments, this number can change based on the particular time interval. For instance, it may be determined that two backup web servers are required on Mondays from noon to 2 PM, but four backup web servers are required on Wednesdays from 8 PM to 10 PM. Although two backup web servers are shown in FIG. 4, it should be appreciated that any number of backup web servers can be supported.

It should be appreciated that process 500 is illustrative and that variations and modifications are possible. Steps described as sequential may be executed in parallel, order of steps may be varied, and steps may be modified, combined, added, or omitted. One of ordinary skill in the art would recognize many variations, modifications, and alternatives.

Figure 6:
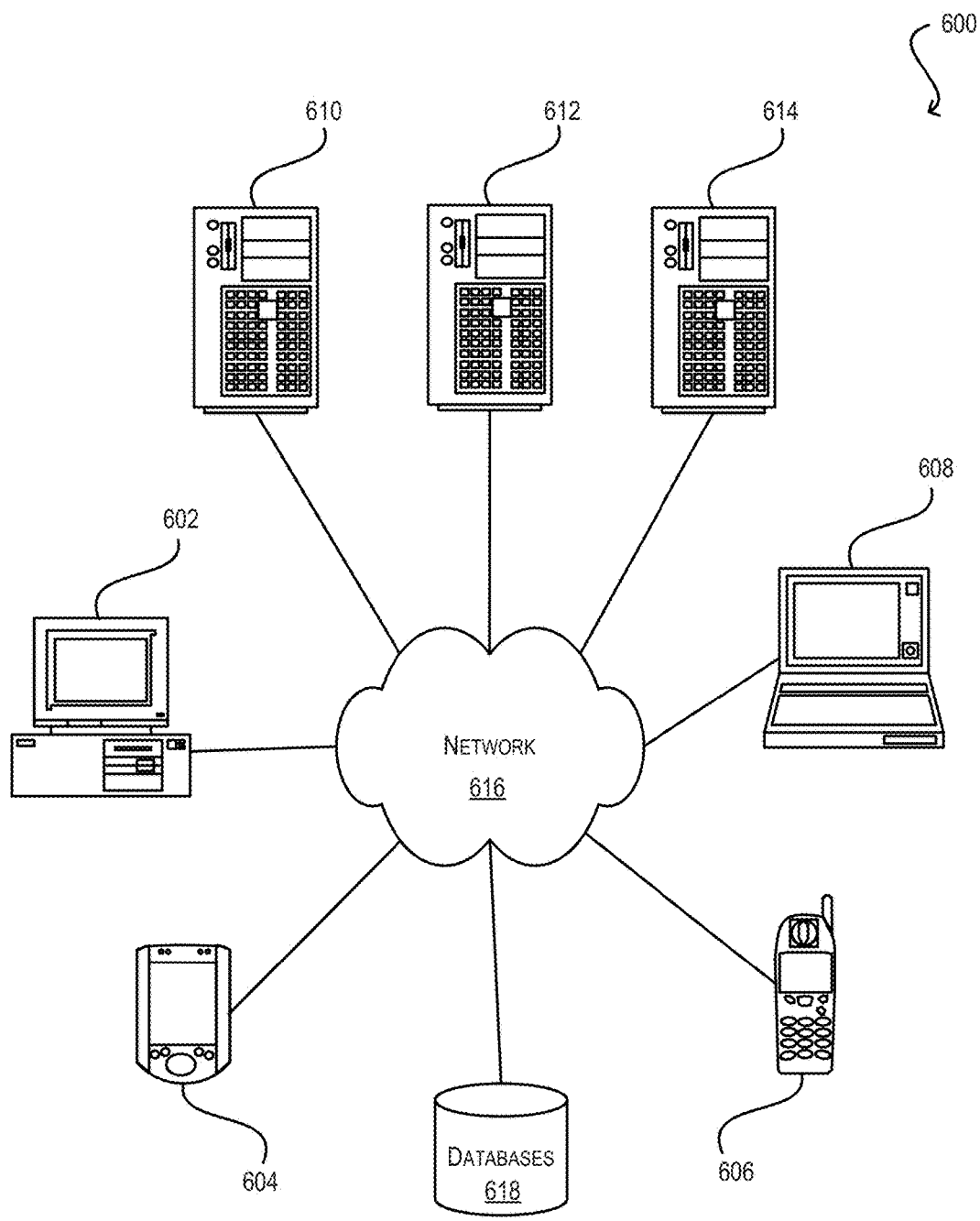
FIG. 6 is a simplified block diagram of a system environment that may be used in accordance with an embodiment of the present invention.

FIG. 6 is a simplified block diagram illustrating a system environment 600 that may be used in accordance with an embodiment of the present invention. As shown, system environment 600 includes client computing devices 602, 604, 606, 608 communicatively coupled with server computers 610, 612, 614 via a network 616. In one set of embodiments, client computing devices 602, 604, 606, 608 can each be configured to run a web browser or other client application for requesting web resources from server computers 610, 612, 614. Server computers 610, 612, 614 can each be configured to run an instance of a web server (e.g., primary web server 102, backup web server 110, or backup web server 112 of FIG. 1) for servicing requests received from client computing devices 602, 604, 606, 608. Although system environment 600 is shown with four client computing devices and three server computers, any number of client computing devices and server computers may be supported.

Client computing devices 602, 604, 606, 608 can be general purpose personal computers (including, for example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client computing devices 602, 604, 606, 608 can be any other electronic device capable of communicating over a network (e.g., network 612 described below) with server computers 610, 612, 614.

Server computers 610, 612, 614 can be general purpose computers, specialized server computers (including, e.g., LINUX servers, UNIX servers, mid-range servers, mainframe computers, rack-mounted servers, etc.), server farms, server clusters, or any other appropriate arrangement and/or combination. Server computers 610, 612, 614 can run an operating system including any of those discussed above, as well as any commercially available server operating system. Server computers 610, 612, 614 can also run any of a variety of server applications and/or middle-tier applications, including web servers, Java virtual machines, application servers, database servers, and the like. As indicated above, in one set of embodiments, server computers 610, 612, 614 are each adapted to run a web server and associated software for servicing requests from client computing devices 602, 604, 606, 608.

As shown, client computing devices 602, 604, 606, 608 and server computers 610, 612, 614 are communicatively coupled via network 616. Network 616 can be any type of network that can support data communications using any of a variety of commercially-available protocols, including without limitation TCP/IP, SNA, IPX, AppleTalk, and the like. Merely by way of example, network 616 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 can also include one or more databases 618. In one set of embodiments, database 618 can include any database or data storage component discussed in the foregoing disclosure, such as storage component 104 of FIGS. 1 and 4. Database 618 can reside in a variety of locations. By way of example, database 618 can reside on a storage medium local to (and/or resident in) one or more of the computers 602, 604, 606, 608, 610, 612, 614. Alternatively, database 618 may be remote from any or all of computers 602, 604, 606, 608, 610, 612, 614 and/or in communication (e.g., via network 616) with one or more of these. In one set of embodiments, database 618 can reside in a storage-area network (SAN) familiar to those skilled in the art. Similarly, any necessary files for performing the functions attributed to the computers 602, 604, 606, 608, 610, 612, 614 can be stored locally on the respective computer and/or remotely on database 618, as appropriate. In one set of embodiments, database 618 is a relational database, such as Oracle 10g available from Oracle Corporation. In particular embodiment, database 618 is adapted to store, update, and retrieve data streams in response to SQL-formatted commands.

Figure 7:
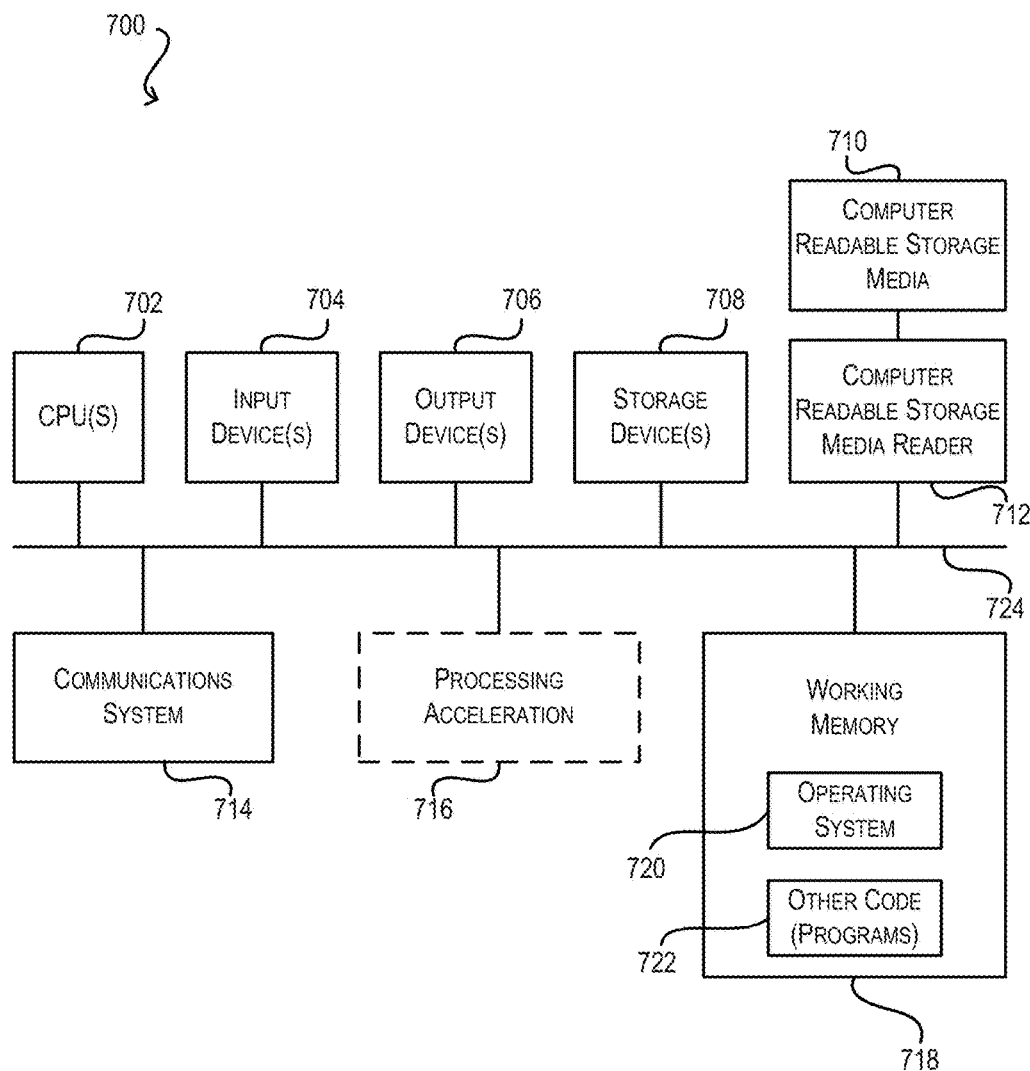
FIG. 7 is a simplified block diagram of a computer system that may be used in accordance with an embodiment of the present invention.

FIG. 7 is a simplified block diagram illustrating physical components of a computer system 700 that may incorporate an embodiment of the present invention. In various embodiments, computer system 700 can be used to implement any of the computers 602, 604, 606, 608, 610, 612, 614 illustrated in system environment 600 described above. As shown in FIG. 7, computer system 700 comprises hardware elements that can be electrically coupled via a bus 724. The hardware elements can include one or more central processing units (CPUs) 702, one or more input devices 704 (e.g., a mouse, a keyboard, etc.), and one or more output devices 706 (e.g., a display device, a printer, etc.). Computer system 700 can also include one or more storage devices 708. By way of example, storage device(s) 708 can include devices such as disk drives, optical storage devices, and solid-state storage devices such as a random access memory (RAM) and/or a read-only memory (ROM), which can be programmable, flash-updateable and/or the like.

Computer system 700 can additionally include a computer-readable storage media reader 712, a communications subsystem 714 (e.g., a modem, a network card (wireless or wired), an infra-red communication device, etc.), and working memory 718, which can include RAM and ROM devices as described above. In some embodiments, computer system 700 can also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 can permit data to be exchanged with network 616 of FIG. 6 and/or any other computer described above with respect to system environment 600.

Computer system 700 can also comprise software elements, shown as being currently located within working memory 718, including an operating system 720 and/or other code 722, such as an application program (which may be a client application, web browser, web server application, RDBMS, etc.). It should be appreciated that alternative embodiments of computer system 700 can have numerous variations from that described above. For example, customized hardware can also be used and/or particular elements can be implemented in hardware, software (including portable software, such as applets), or both. Further, connection to other computing devices such as network input/output devices can be employed.

In one set of embodiments, the techniques described herein can be implemented as program code executable by a computer system (such as computer system 700) and can be stored on machine-readable storage media. Machine-readable storage media can include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described, various modifications, alterations, alternative constructions, and equivalents are within the scope of the invention. For example, embodiments of the present invention are not restricted to operation within certain specific environments, but are free to operate within a plurality of environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. The scope of the invention should be determined not with reference to the above description, but instead should be determined with reference to the pending claims along with their full scope or equivalents.

What is claimed is:

1. A method comprising:
   automatically determining, by a computer system, a threshold value for an operational metric of a web server, the determining comprising:
   logging information related to a plurality of requests received by the web server over a period of time; and
   applying one or more heuristics-based rules to the logged information in order to determine an appropriate value for the threshold value;
   identifying, based at least in part on the logged information and the determined threshold value, a time interval of high web server load during which additional web servers should be provisioned;
   subsequently to automatically determining the threshold value, monitoring, by the computer system, the operational metric as requests are received by the web server; and if the operational metric exceeds the threshold value during the identified time interval:
  provisioning, by the computer system, one or more additional web servers; and
  routing, by the computer system, a portion of the requests to the one or more additional web servers; and
automatically decommissioning the provisioned one or more additional web servers after the identified time interval has passed.

2. The method of claim 1 further comprising, subsequent to the operational metric exceeding the threshold value:
if the operational metric falls below the threshold value, decommissioning, by the computer system, the one or more additional web servers.

3. The method of claim 1 wherein the one or more heuristics-based rules is received from a user.

4. The method of claim 1 wherein the web server is configured to respond to the requests it receives if the operational metric does not exceed the threshold value, and wherein the computer system routes all of the requests received by the web server to the one or more additional web servers while the operational metric exceeds the threshold value.

5. The method of claim 1, wherein the amount of one or more additional web servers provisioned by the computer system depends on the extent to which the operational metric exceeds the threshold value.

6. A method comprising:
automatically determining, by a computer system, a threshold value for an operational metric of a web server, the determining comprising:
  logging, by the computer system, information related to a plurality of requests received by a web server over a period of time; and
  applying one or more heuristics-based rules to the logged information in order to determine an appropriate value for the threshold value;
determining, by the computer system, a pattern of high web server load based on the logged information and the threshold value, the threshold value representing a value for an operational metric of the web server that, when exceeded, indicates high web server load; and
generating, by the computer system, a policy based on the pattern of high web server load, the policy indicating a recurring time interval;
provisioning one or more additional web servers when the recurring time interval arrives and the operational metric exceeds the threshold value;
routing a portion of requests received by the web server to the one or more additional web servers during the recurring time interval; and
automatically decommissioning the one or more additional web servers when the recurring time interval has passed.

7. The method of claim 6 wherein the one or more heuristics-based rules is received from a user.

8. The method of claim 6 wherein the web server is configured to respond to the requests it receives if the operational metric does not exceed the threshold value, and wherein the computer system routes all of the requests received by the web server to the one or more additional web servers while the operational metric exceeds the threshold value.

9. The method of claim 8 wherein
the amount of one or more additional web servers provisioned by the computer system depends on the extent to which the operational metric exceeds the threshold value.

10. The method of claim 6 wherein determining the pattern of high web server load comprises processing the logged information using a heuristics-based pattern matching algorithm.

11. The method of claim 10 wherein the processing is performed by a complex event processing server.

12. A system comprising:
a web server configured to receive a plurality of requests for accessing a resource over a period of time and log data related to the plurality of requests over the period of time;
a storage component communicatively coupled to the web server configured to store logged data related to the plurality of requests over the period of time from the web server, the web server comprising at least one processor configured to execute computer executable instructions to collectively at least:
monitor a value for an operational metric as the plurality of requests are received from the web server;
compare the value of the operational metric to a threshold value, wherein the threshold value is automatically determined by applying one or more heuristics-based rules to the logged data;
identify, based at least in part on the logged data and the threshold value, a time interval of high web server load;
provision one or more additional web servers if the value of the operational metric exceeds the threshold value during the time interval of high web server load;
route a portion of the requests to the one or more additional web servers;
automatically decommission the one or more additional web servers after the identified time interval has passed.

13. The system of claim 12 wherein the web server is configured to respond to the requests it receives if the operational metric does not exceed the threshold value, and wherein the web server is further configured to route all of the requests received by the web server to the one or more additional web servers while the operational metric exceeds the threshold value.

14. The system of claim 12 wherein the amount of one or more additional web servers provisioned by the web server depends on the extent to which the operational metric exceeds the threshold value.

15. A non-transitory computer readable storage medium having stored thereon instructions executable by a computer system, the instructions comprising:
instructions that cause the computer system to automatically determine a threshold value for an operational metric of a webserver, the determining comprising:
  logging, by the computer system, information related to a plurality of requests received by a web server over a period of time; and
  applying one or more heuristics-based rules to the logged information in order to determine an appropriate value for the threshold value;
instructions that cause the computer system to determine a pattern of high web server load based on the logged information and the threshold value, the threshold value representing a value for an operational metric of the web server that, when exceeded, indicates high web server load; and instructions that cause the computer system to generate a policy based on the pattern of high web server load, the policy indicating a recurring time interval;

instructions that cause the computer system to provision one or more additional web servers when the recurring time interval arrives and the operational metric exceeds the threshold value;

instructions that cause the computer system to route a portion of requests received by the web server to the one or more additional web servers during the recurring time interval; and instructions that cause the computer system to automatically decommission the one or more additional web servers when the recurring time interval has passed.

* * * * *